Sept. 5, 1961 H. R. LUBCKE 2,999,185

TELEVISION DEVICE

Filed Jan. 9, 1950 3 Sheets-Sheet 1

INVENTOR.
Harry R. Lubcke

TELEVISION DEVICE

Filed Jan. 9, 1950

3 Sheets-Sheet 2

INVENTOR.
Harry R. Lubcke

INVENTOR.
Harry R. Lubcke

United States Patent Office
2,999,185
Patented Sept. 5, 1961

2,999,185
TELEVISION DEVICE

Harry R. Lubcke, Los Angeles, Calif.
(2443 Creston Way, Hollywood 28, Calif.)

Filed Jan. 9, 1950, Ser. No. 137,635
38 Claims. (Cl. 315—13)

This invention relates to television and more particularly to improvements in reproducing apparatus for forming a single image from plural components of information, as in color processes.

It will be recognized that the formation of a complete image in color upon a single surface is desirable in apparatus for color television reproduction. It will be further recognized that simple means, accurate in function, for forming the image are also desirable; being essential in any system of wide practical application.

Some attempts in this direction have been made by utilizing a plurality of separate electron guns disposed around an evacuated enevlope. Such devices are impractical because the necessary physical orientation of the guns requires either single or compound keystone correction.

Incomplete keystone correction produces registry problems of the same magnitude as the optical super-position of separate images; the problem which it was sought to avoid. Also, separate deflecting means for each of the electron streams are required. These must function identically or further inaccuracies in registration result.

The need for keystone correction can be eliminated by causing multiple electron streams to originate at substantially the same point. In this invention, these streams so originate, and with an initial mutual divergence. This makes it possible to accomplish scanning with a single deflecting means for all the electron streams, thus removing two of the difficulties of the prior art.

The initially divergent streams are caused to converge at the fluorescent screen by an electron-optical instrumentality. Such convergence causes the individual streams to arrive at the fluorescent screen from different directions. Thus, a multi-planar faceted surface recurrently coated with different phosphors gives a complete color image upon the single screen.

In the present invention the plurality of electron streams may be modulated in intensity with time, each corresponding to one primary color, in accordance with the known method of forming an image in color. In the transmitting equipment, not a part of this invention, the field of view is analyzed into primary colors by known means, such as by interposing appropriately colored filters in the optical system or systems of the camera.

The method of the present invention may be used coactively with a number of transmitting methods. The transmission of the several colors may be accomplished simultaneously, sequentially, or in any other relation between scanning process and time. It is only necessary that the plural electron streams of this invention be modulated and deflected in accordance with the colors and the relative positions of the exploring element or elements in the field of view at the transmitter. The color components thus transmitted and recreated may vary from instant to instant, from line to line, or from frame to frame of the scanning process; or may be transmitted simultaneously.

The present invention may be used to meet needs other than color television. In navigation, the reproduction of a map can be accomplished by the functioning of one of the electron streams, while related yet separately obtained information as to the location of other vehicles is superimposed by the functioning of other electron streams, each component of information being reproduced in a different color or with different polarization of the emitted energy.

Similarly, two maps can be continuously compared, one, for instance, having been made on a previous flight of an airplane and reproduced by the functioning of one electron stream in the subject device while the second map is made while the airplane traverses the same territory and is reproduced by another electron stream, in a different color. In this way, discrepancies in the terrain, of value in warfare, become immediately apparent and the plane can engage in bombing maneuvers on the spot.

The major object of this invention is to provide a simple electronic device for the accurate reproduction of an image from plural components of information.

Another object of this invention is to provide a simple cathode ray tube system for the accurate reproduction of color television images.

Another object of this invention is to provide a simple and desirable structure for the envelope of the cathode ray device.

Another object of this invention is to eliminate the need for multiple deflecting means.

Another object of this invention is to eliminate the need for keystone correction instrumentalities.

Another object of this invention is the creation of a dynamic electron lens.

Another object of this invention is to provide a single means of deflection and other spatial control of the electron streams representing each color component, to the end that registry problems are eliminated.

The advantages of the present invention will be further apparent from the following description and the drawings in which.

Figures 1, 2, 3:
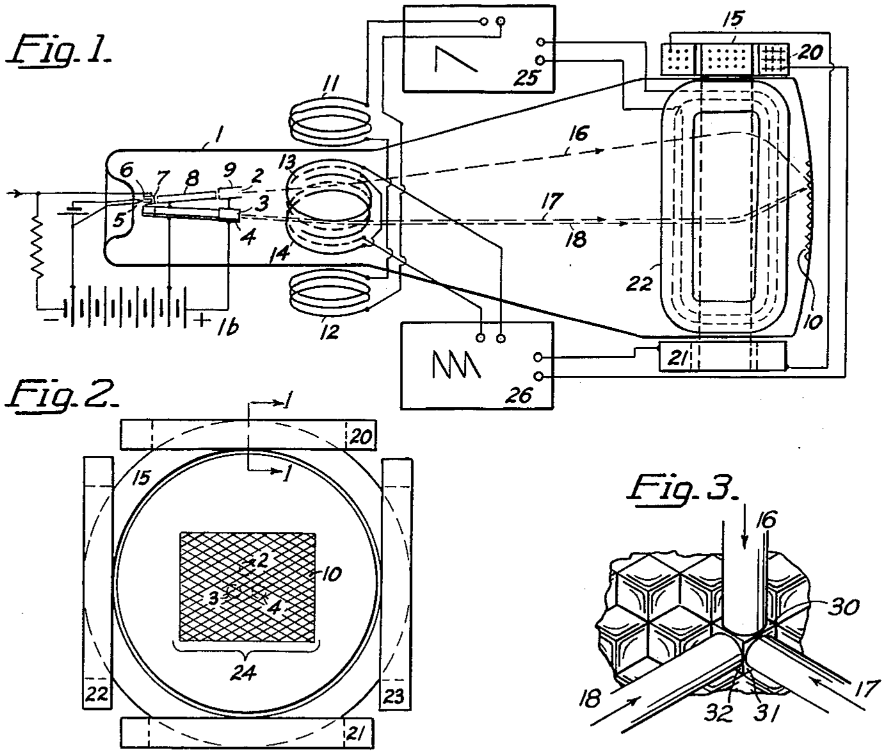
FIG. 1 shows one form of the invention employing divergent electron guns and electromagnetic means for converging the electron streams.
FIG. 2 shows a front elevation view of the same.
FIG. 3 shows an illustrative portion of a tri-incident screen.

Referring now to FIG. 1, numeral 1 indicates the vacuum-tight enclosing envelope of the device, which may be composed of glass according to the current art. Numerals 2, 3, and 4 indicate electron guns closely grouped together but arranged with mutual divergence of the electron emitting axes. Each gun is composed of a thermal heater 5, cathode 6, grid 7, first anode 8 and second anode 9 as shown in the sectional view of gun 2. Variation in the gun construction may be permitted so long as each gun is capable of emitting an electron stream focused into a small spot at screen 10 and capable of being modulated according to the intensity variations with scanning of given primary information existent in the field of view. The usual power supply voltages are supplied; in FIG. 1 by means of a battery, 1*b*.

Magnetic deflection coils 11 and 12, shown schematically, are positioned above and below the neck of envelope 1. When activated by electric current synchronously proportional to the horizontal position of the exploring element in the transmitter field of view these function to position all three electron streams in a corresponding horizontal position with respect to screen 10. Coils 13 and 14 accomplish a similar function with respect to vertical scanning, being located on opposite sides of the neck.

Element 15 is a concentrated coil of wire conveniently consisting of a considerable number of turns. A constant electric current is caused to flow through this coil. The combination comprises a short electron lens of the magnetic type. The value of the ampere turns is adjusted until the divergent electron streams 16, 17, and 18 are caused to converge upon closely adjacent areas upon transducing screen 10 as shown. The interaction between the radial components of the magnetic field and the electron streams is in conformance with the known effect of the force exerted upon a current traversing a magnetic field.

Coils 20 and 21 are positioned adjacent to coil 15 as shown in both FIG. 1 and 2. These coils are connected together in either series or parallel with the turns in the same direction, so that the magnetic field produced by each will aid that of the other. A circular shape may be used, but the rectangular shape is to be preferred. A current proportional to that which also flows in the low frequency deflection coils 13 and 14 passes through coils 20 and 21, as from other terminals on low frequency scanning source 26.

Normally, the field due to coil 15 has axial symmetry along the axis. When the fields from coils 20 and 21 are combined therewith, however, reinforcement on one side of the coil 15 and weakening on the other side gives a resultant field which is inclined to the normal axis of both coil 15 and envelope 1. In FIG. 1, coil 20 and the top of coil 15 are shown in section for clarity.

I have found that the inclination of the axis of the magnetic lens is in the direction of the auxiliary magnetic field, not at right angles thereto as is the case for magnetic deflection of an electron stream.

In the embodiment shown in FIGS. 1 and 2, the electron streams lie in planes 120 degrees at an angle one to the other. In FIG. 1, the electron streams 17 and 18 are shown slightly displaced for clarity; a convention repeated in other figures. I have found that the axis of the electron lens must also be altered in the horizontal direction with deflection of the scanning streams so that the converging effect thereof will be equally effective in any position over the image area 24. This is accomplished by providing two more coils on the sides of envelope 1 at lens 15, identified by numerals 22 and 23. These are connected to an output of the high frequency scanning source 25 which is, of course, in synchronism with the high frequency scanning deflection fed from the same source to coils 11 and 12.

In the same manner as described above with respect to coils 20 and 21 the field from coils 22 and 23 modifies the basic field of lens 15 and the axis of said lens is electrically shifted over the scanning area 24 in synchronism with the deflection of the scanning beams.

Thus, the axis of the resulting magnetic lens inclines and moves from side to side with the scanning deflection. This causes the electron streams 16, 17, and 18 to converge in closely adjacent areas upon screen 10 regardless of where the streams are positioned by the normal television scanning process.

In practice, a few hundred ampere turns is a value sufficient for coil 15 and approximately half is sufficient as a maximum value for each of coils 20 and 21. It is desirable to construct the device with coil 15 somewhat large with respect to the area of the raster 24 scanned over in reproducing the television image. In one embodiment, the coil 15 diameter was twice as large as the maximum dimension of the raster. It is to be noted that the envelope 1 of the cathode ray tube need not be this large, only of sufficient size to accommodate the raster and the electron trajectories.

As is known, it is characteristic of optical and electron-optical elements to introduce aberrations in rays far removed from the optical axis. The structure recited is thus convenient.

Should a more compact structure be mandatory, corrective means are employed. The current through coil 15, rather than being constant, is caused to vary in combination with a departure of waveform through coils 20 and 21 from that directly proportional to the scanning position. The voltage ratio between anodes 8 and 9 is also modified with position of the scanning spot. For one instance, should it be desirable to have the curvature of screen 10 other than circumferential with respect to the center of deviation of the electron streams, which is in the deflection system 11, 12, 13, and 14, the voltage ratio between 8 and 9 may be reduced at the extremes of the screen for a more nearly flat surface of screen 10 than previously described.

FIG. 3 shows a portion of a tri-incident screen which is adapted for receiving the impact of electron streams essentially perpendicularly to the separate faces of the screen. As shown by the shading, each facet is somewhat concave. This results in a slight ridge between facets and this has the effect of preventing stray electrons from impinging upon a facet of the screen other than the one upon which such impingement is substantially perpendicular. In the figure, for instance, electron stream 16 impinges upon facet 30, stream 17 upon facet 31 and stream 18 upon facet 32, each facet having an area equal to or less than the cross-sectional area of the electron streams.

I have found that a convenient angle of incidence of the plural electron streams 16, 17, and 18 upon screen 10 of FIG. 1 is 45° to the perpendicular to the screen. Thus, the angle between adjacent facets 30—31—32 of the screen of FIG. 3 is made 90°. The angle of incidence is determined by the initial divergence of the electron streams, the position of the converging assembly (represented by coil 15) and the ampere-turn product thereof. By suitable variation of these values other angles of incidence can be achieved. In this specification numerical values are stated in the interest of lucidity. I do not restrict the scope of the invention to them.

In a typical embodiment the aforementioned facets are each coated with a phosphor giving forth a primary color of the color television system. For instance, all facets lying in planes parallel to facet 30 are coated with a phosphor which emits green light upon impingement of electron stream 16, all facets parallel to 31 are coated to produce red light upon impingement of electron stream 17 and all facets parallel to 32 to produce blue light upon impingement of beam 18. The compositions of phosphors capable of thus emitting colored light is known to the art.

An alternate transducing construction is obtained by merely treating the aforementioned surfaces with known materials as alkali halides, capable of altering the color of white light upon electron impact to that required on the particular face to produce the necessary color component. In this arrangement, the screen 10 is merely viewed against daylight.

Any other chromatic system for accomplishing color television may be utilized, such as that employing complementary colors, by suitably preparing the light emissive or transmissive properties of the facets.

Figure 4:
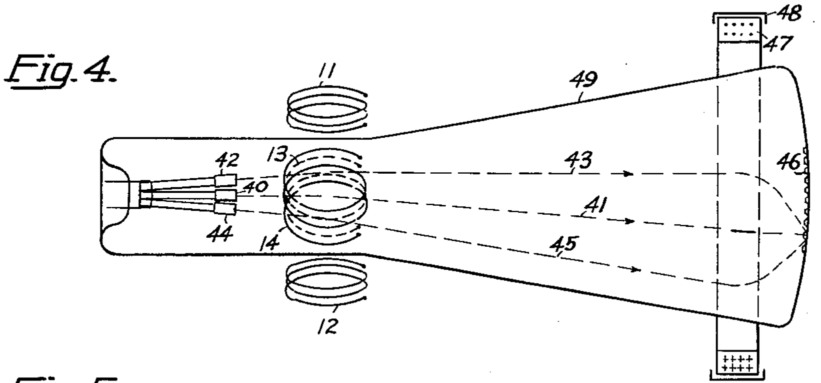
FIG. 4 shows a modification utilizing plural electron streams lying substantially in a single plane.

FIG. 4 shows a simplified embodiment of this invention. This is accomplished by orienting the electron guns to produce three electron streams all lying substantially in a vertical plane. The gun 40 produces an axial electron stream 41 in a manner analogous to the usual cathode ray tube for black and white image reproduction. Gun 42 emits stream 43 at an angle inclined above the axial stream 41 and gun 44 emits a stream 45 at an angle below stream 41.

The vertical and horizontal deflection coils 11, 12, 13 and 14 deflect the plural streams as in FIG. 1.

A magnetic electron lens 47 converges the electron streams upon screen 46. This lens is larger than the prior lens 15 since dynamical auxiliary coils are not used. I have found that if the maximum dimension of the raster does not exceed about one-third of the dimension of the coil lens 47 the aberration-free central area thereof will accomplish the converging action sought.

A metallic ring of high permeability 48 is shown surrounding coil 47. This ring concentrates the flux of the coil, causing it to extend less far along the axis of the cathode ray tube and consequently increase the angle between the perpendicular to the screen 46 and the path of divergent streams 43 and 45. The combination 47 and 48 is positioned nearer the screen than would be the case were coil 47 used alone.

Lens 47 may be used for the embodiment of FIGS. 1 and 2 instead of the system 15, 20, 21, 22, and 23 if the raster size relation above referred to is observed.

Figure 5:
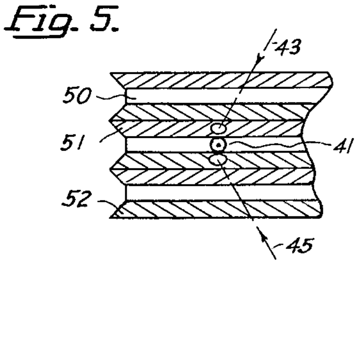
FIG. 5 shows an illustrative portion of a ribbed, truncated screen.

FIG. 5 shows a portion of a truncated, ribbed screen suitable for converting the energy of impact of the electron streams 41, 43, and 45 to plural colored light on the general surface 46 of envelope 49 in FIG. 4. In this screen, electron stream 41 impinges upon the truncated surface 50, which is coated, for instance, with a phosphor emitting green light upon electron impingement. In an analogous manner, stream 43 impinges upon the slanting surface 51 to produce red light and stream 45 impinges upon slating surface 52 to produce blue light.

It is, of course, necessary to have the scanning lines of the raster aligned with the ridges of the screen. This is easily accomplished by circumferentially adjusting the deflection coils 11, 12, 13, and 14 while observing the operation of the tube. It is to be noted that the operation of the electron lens 47 impresses a rotation upon the image of a considerable number of degrees, of the order of ninety. The plane of the electron guns 40, 42, and 44 is oriented during construction with this factor in mind. It is also to be noted that any second order deflection effects upon stream 41 caused by the electron lens can be eliminated by altering the linearity of the basic scanning waveforms acting in elements 11, 12, 13 and/or 14.

It is to be noted that the embodiment of FIGS. 4 and 5 has the advantage of allowing the impingement of one electron stream to be substantially normal with the axis of the tube toward the direction of the viewer. Since the art has determined that the green image conveys the greatest amount of information concerning the detail in a color image, electron stream 41 is preferably controlled according to the information concerning the green component in the field of view at the transmitter and the truncated surface 50 coated with the green phosphor.

Not only can a dynamic electron lens be formed with a magnetic field, but also with an electrostatic field. It is possible, within the scope of this invention, to construct a number of electron lenses of different types suitably modified to be dynamic in either one or two dimensions. The following are some of the embodiments to be preferred.

Figure 6:
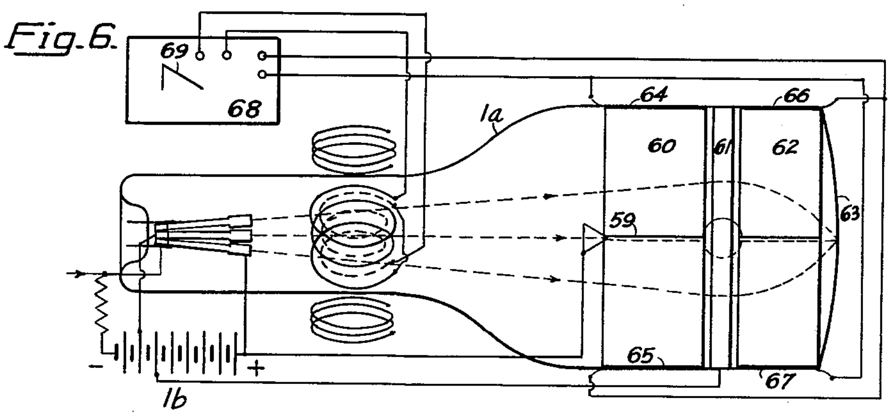
FIG. 6 shows a modified form of the invention utilizing an electrostatic converging means composed of three cylindrical elements.

In FIG. 6 is shown a three cylinder type lens capable of electrical alteration of the electron optic axis by means of current flow, and a consequent potential drop, around the circumference of the cylinders.

In FIG. 6, hollow cylinders 60, 61, and 62 are conveniently formed on the inner surface of envelope 1*a* by sputtering metal in vacuum or depositing a semiconductor in the shape indicated. The potential of the center cylinder 61 is maintained relatively low, approaching that of the cathode of the electron guns utilized in the cathode ray tube. Conversely the potential of cylinders 60 and 62 are either the highest or nearly the highest potential existent in the tube. Particularly is it desirable that the potential of cylinder 62 be high, so that the velocity of impingement of electrons upon the screen surface indicated at 63 may be great.

Normally, the electron lens above recited exercises a converging effect toward the axis of the cylinders upon electron streams which pass through it. In the present instance, electrodes 64, 65, 66, and 67 extend, with relatively high conductivity, along the line of the intersection of an imaginary vertical plane and the aforementioned cylinders. Electrodes 64 and 67 are connected together as are also electrodes 65 and 66. The resulting pair of connections are connected to a source of alternating potential 68 which delivers a waveform proportional to and in synchronism with the low-frequency scanning deflection waveform. It will be noted that the polarity of application of this potential is reversed with respect to the tops and bottoms of cylinders 60 and 62.

Considering cylinder 60, it will be seen that the potential impressed between the electrodes 64 and 65 will cause a small current to flow. The resistance of the material of cylinder 60 is purposely made high so that the power consumption will be very small. Because of the current flow, a uniform variation of the potential will exist around both sides of cylinder 60, from electrode 64 to electrode 65. Because of this, the equipotential surfaces within the space of hollow cylinder 60 will be displaced. Half of the focusing action of the lens takes place in the space between cylinders 60 and 61 and the otherwise symmetric disposition of the equipotential surfaces around the geometrical axis of the cylinders is disploced downward with respect to the value of positive potential existing upon any given surface.

By the same process, the equipotential surfaces existing between cylinders 61 and 62 are moved upward. Thus, the electrical axis of the lens combination has been inclined upward going from left to right in the figure. This is the condition corresponding to the maximum positive excursion of the waveform 69 shown schematically within rectangle 68. At the mid-point of the same wave, the average potential of the cylinders is unaltered and at the negative maximum of the waveform the condition is reversed, thus depressing the electrical axis. It will be noted that the average potential of the cylinders from battery 1*b* is applied via electrodes 59 at the horizontal diameters.

The electrostatic lens of FIG. 6 is arranged to operate with such embodiments as require inclination of the lens axis in one direction only (the vertical in this example).

Figure 7:
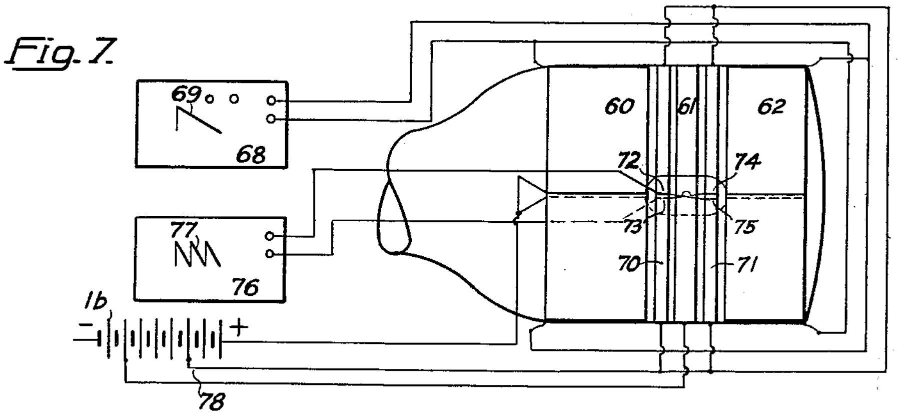
FIG. 7 shows a similar form utilizing five cylindrical elements.

In FIG. 7 a further modification is shown in which the lens axis may be shifted in horizontal as well as vertical directions. The general construction including cylinders 60, 61, and 62 is the same as in FIG. 6. There are added, however, two additional cylinders 70 and 71. These are narrow and are placed between cylinders 60 and 61, and 61 and 62, respectively. Electrodes are provided at the extremes of a horizontal diameter at 72, 73 and 74, 75. In the same manner as previously, auxiliary connections are made to a high frequency scanning source 76. The energy waveform thereof causes a horizontal shift in equipotential surfaces in the same way as energy from prior instrumentalities caused a vertical shift.

Since the cylinders 70 and 71 are narrow, that is, short axially, they will not eliminate the effect of the potentials on the wider cylinders 60 and 62, although the former are placed closer to the middle cylinder 61. Further, the average potential of cylinders 70 an 71 may be made less than that on cylinders 60 and 62 by a tap 78 on the illustrative battery shown at 1*b*. By adjustment of the amplitudes of the varying and average potentials in relation to the size of cylinders 70 and 71, the desired operation of electron lens axis deviation over both dimensions of the desired screen area can be accomplished.

Figures 8, 11:
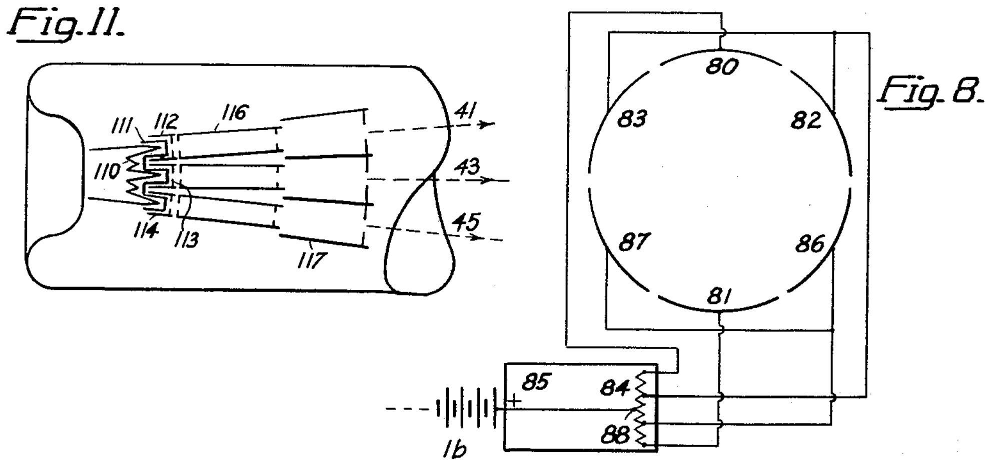
FIG. 8 shows a front elevation view of a modification of FIG. 6 in which the cylindrical elements are divided into segments.
FIG. 11 illustrates a multiple gun modification.

A further alternate construction of the lens of FIG. 6 is possible as shown in FIG. 8, in front elevation. Here an even number of segments extending axially are provided. The top and bottom segments 80 and 81 constitute the maximum and minimum potential electrodes. Around the circumference, other corresponding segments, such as 82, 83 are joined together and to an intermediate value of alternating potential such as is obtained from a tap on a potentiometer 84 in low-frequency waveform producing device 85. The center-tap 88 is connected to battery 1*b*.

Figure 9:
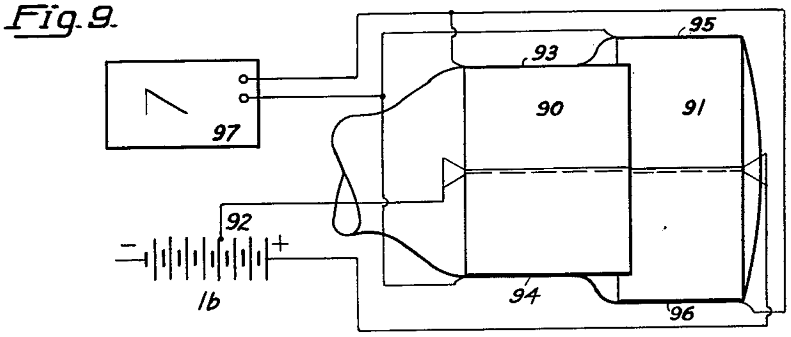
FIG. 9 shows a modification in which the electrostatic converging means consists of two cylindrical elements.

FIG. 9 shows a further alternate electrostatic electron lens construction in which the basis of the focusing action for a difference in potential between two hollow cylindrical conductors 90 and 91. The cylinder 90 is of smaller diameter than cylinder 95 and is held at an intermediate potential with respect to all the electrodes in the system in the cathode ray tube by a tap 92 on the illustrative battery 1*b*. Electrodes 93, 94, 95 and 96 are cross-connected and are also connected to a source of low-frequency scanning energy 97 of the same general nature as the previously described source 68. The axis is inclined between the two cylinders because of current flow through the electrodes in the same manner as previously described.

In either of FIGS. 6, 7, 8 or 9 the inclination potential may be applied to only one of the hollow cylinders. The effect per volt of alternating energy is less, but this may be overcome by increasing the amplitude of the alternation.

Figure 10:
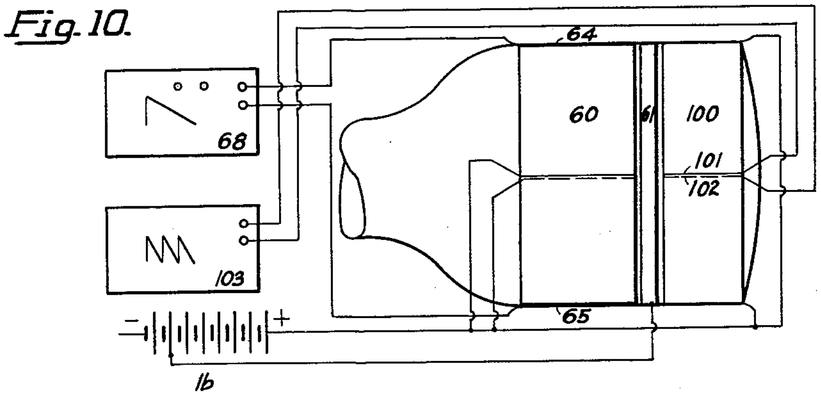
FIG. 10 shows a modification in which two of the three cylinder converging means are connected in a different manner.

FIG. 10 shows how this arrangement can be applied to a three-cylinder lens to accomplish both horizontal and vertical deviation of the electron axis. Similar to FIG. 6, the electrodes 64 and 65 of cylinder 60 are connected to low-frequency waveform device 68. However, on cylinder 100, the electrodes are placed at the intersection with the horizontal diameter and electrodes 101 and 102 are connected to high-frequency waveform device 103, which is similar to the device 76 in FIG. 7. Center cylinder 61 is connected to a relatively low potential as in FIG. 6. The vertical inclination force is developed between cylinders 60 and 61 and the horizontal deviation between cylinders 61 and 100.

FIG. 11 shows a multiple type gun modification for the device of FIG. 4. Thermal heater 110 causes electron emission from common cathode 111, the latter being coated with emitting material only on the protruding portions. Separate grids 112, 113, and 114 control the intensity of each of the electron streams 41, 43, and 45. A common multi-cellular first anode 116 and an equivalent second anode 117 completes the accelerating structure.

Figure 12:
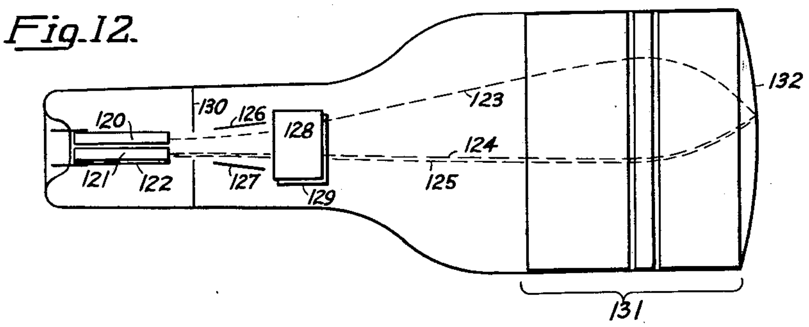
FIG. 12 shows a modification in which the electron streams are caused to diverge after discharge from non-divergent guns.

FIG. 12 shows another alternate construction of the device in which diverging means is employed to cause the plural electron streams to diverge following emission from essentially axially positioned electron guns. In this instance, guns 120, 121, and 122 emit electron streams 123, 124, and 125 in parallel streams. Diverging aperture lens 130 being held at a potential considerably greater than the guns but only somewhat less than the succeeding structure, causes the electron streams to diverge as shown. These are deflected by deflection plates 126, 127, 128, and 129 in the conventional manner. Triple electrostatic electron converging lens 131 accomplishes convergence of plural streams on screen 132 according to the arrangement of FIG. 10. Since diverging lens 130 will cause not only the streams to diverge, but each to increase in cross-section as well, it is necessary to adjust the potentials of the electron guns to exercise a greater initial converging effect upon the streams.

It is evident that the electrostatic deflecting means shown in FIG. 12 may be employed in lieu of the electromagnetic means shown in the other figures.

Considering the embodiments of this invention as a whole it will be appreciated that precision of construction or adjustment is not required. For instance, the angle of impingement of any or all of the plural electron streams upon the facets of the screen may depart considerably from the perpendicular without affecting the quality of the operation. The shift of the axis of the dynamical electron lenses need only approximate the direction of the electron streams. I have found that the required converging effect of the lenses remains constant over a reasonable cross-sectional area. Finally, the functioning of the cathode ray device is determined by voltages and/or currents capable of adjustment in coaction with the evacuated structure. These attributes are important in practical applications.

Obvious modifications of the specific embodiments disclosed may be made and these will come within the scope of this invention.

Having thus fully described and illustrated my invention, I claim:

1. In a television system wherein plural electron streams impact upon a plural-planar surface, the method of impacting more than two electron streams upon a surface which comprises, in order, forming a mutually divergent bundle of said electron streams, deflecting said bundle of streams as a group over a common area of said surface exclusively converging all said electron streams prior to contiguous impact upon said surface, and forming only one television image upon said surface.

2. In a television system wherein more than two electron streams impact upon a surface having many contiguous areas lying in different planes, the method of impacting mutually convergent electron streams upon a surface which comprises, in order, forming said electron streams in a mutually divergent bundle, deflecting said bundle of streams as a whole over a common area, exclusively converging all said electron streams prior to contiguous impact upon adjacent planes of said surface, and forming only one television image upon said surface.

3. In a television reproducing system wherein more than two electron streams impact upon a faceted transducing screen, the method of impacting mutually convergent electron streams upon closely adjacent facets of said screen which comprises, in order, forming said electron streams in a mutually divergent bundle, deflecting said bundle of streams as a whole over a common area, exclusively converging all said electron streams to contiguous impact upon adjacent facets of said screen, and forming only one integrated television image upon said screen.

4. In a television reproducing system wherein plural separate electron streams impact upon a surface, the method of impacting mutually convergent electron streams upon a surface which comprises, in order, forming said electron streams in a divergent bundle, deflecting said bundle of streams as a whole over a common area, passing said bundle of streams through a magnetic field having an axis of symmetry instantaneously aligned with the axis of said deflected bundle, exclusively convergently impacting all of said bundle of streams upon said surface, and forming only one integrated television image upon said surface.

5. In a color television reproducing system wherein more than two separate electron streams impact upon a surface, the method of impacting mutually convergent electron streams upon a surface which comprises, in order, forming said electron streams in a mutually divergent bundle, deflecting said bundle of streams as a whole over a common area, passing said bundle of streams through an electric field having an axis of symmetry instantaneously aligned with the axis of said deflected bundle, exclusively convergently contiguously impacting said bundle of streams upon said surface, and forming only one integrated color television image upon said surface.

6. Electronic reproducing means, comprising; in order, means for producing more than two separate divergent electron streams, means for deflecting all said streams over a common area, means for exclusively converging said streams and transducing means upon which the converged streams contiguously impact to form only one television image.

7. Television reproducing means, comprising; in order, means for producing more than two divergent electron streams, common means for deflecting all said streams over a common area, means for exclusively converging said streams to close proximity and faceted transducing means upon which the converged streams impact at adjacent concave areas to form only one television image.

8. Color television reproducing means, comprising; in order, adjacent means for producing more than two divergent electron streams, unified means for deflecting all said streams as a group over a common area, unified means for exclusively converging said streams to adjacency, and multi-planar transducing means upon which the converged streams impact at adjacent areas of different inclination to form only one color television image.

9. In an electronic device, in order, means for producing separate electron streams about an axis, common means for deflecting said streams as a group over a common area, means for producing a magnetic field symmetrical with respect to the undeflected axis of said streams, and means coacting with the last said means for altering the radial components of said field with deflection of said streams to preserve the symmetry of said components with respect to the deflected axis for forming only one electron pattern over said area.

10. In an electronic device, in order, means for producing electron streams parallel to an axis, means for diverging said streams one from the other, means for deflecting said streams as a group over a common area, unitary coaxial means for producing an electric field symmetrical with respect to the common undeflected axis of said streams, means coacting with the last said means for altering the space potentials of said field transverse to said undeflected axis with deflection of said streams to retain the symmetry of said potentials with respect to the deflected axis.

11. Television reproducing means, comprising; in order, means for producing plural electron streams, mutually divergent; a single group of means for deflecting said streams; a plural-planar surface positioned to intercept said electron streams; means for producing a magnetic field enclosing said streams adjacent to said screen having radial components which converge said streams upon adjacent planes of said surface.

12. Television reproducing means, comprising; in order, means for producing plural divergent electron streams, unitary means for deflecting said streams, a multi-planar screen positioned to intercept said electron streams, means for producing a toroidal magnetic field enclosing said streams adjacent to said screen, the axis of said toroid lying in the direction of the overall path of said electron streams.

13. Television reproducing means, comprising; in order, means for producing plural divergent electron streams, unitary means for deflecting said streams, a multi-planar surface positioned to intercept said electron streams, means for producing a magnetic field of toroidal shape enclosing said streams adjacent to said surface, means for altering said toroidal field in synchronism with the action of said deflecting means, the axis of said toroidal field being inclined in the direction of the deflection of the electron streams.

14. Television reproducing means for exhibiting images in a plurality of colors, comprising; in order an envelope having an axis, means for forming an axial electron stream, means for forming coplanar electron streams diverging from said axial stream, means for deflecting all of said streams, a transducing screen positioned normal to said axis having truncated ridges lying at right angles to the plane of the electron streams, means for converging said electron streams located adjacent to said screen, a transducing element of one characteristic located upon all of one of the sides of said ridges, of another characteristic upon all of the other sides and of still another characteristic upon the truncated portions, said converging means constituted to exclusively converge said diverging electron streams upon the sides of the truncated ridges of said screen.

15. Electronic color television reproducing means, comprising; in order, a source of electrons, accelerating means arranged to produce a plurality of divergent electron streams, means for altering the intensity of each of said streams according to a primary color, common means for deflecting said plural streams, a multi-planar transducing screen, electron stream converging means axially symmetrical with respect to said streams and located near said screen capable of focusing all said divergent electron streams to a small area upon said screen by convergence only, said multi-planar areas of said screen being of elemental size and positioned recurrently as to inclination of the planes, the transducer of said screen having the characteristic of emitting light of one primary color on each of the plane areas of the same inclination and of another primary color on planes of other inclinations, said areas inclined by groups to suffer impingement of one electron stream upon one group.

16. Electronic color television reproducing means, comprising: a cluster of electron guns oriented to emit mutually divergent electron streams, common means for deflecting all said streams as a group, an electrostatic lens on the opposite side of said deflection means from said guns, a transducing screen lying beyond said lens, said screen composed of a large number of adjacent elemental areas lying in different planes, each oriented to accept impingement of one of said streams and each lying at the point of focus of the electron streams as regards minimum cross-sectional area and of convergence of said streams by said lens for forming a single visible color television image upon said screen.

17. Electronic color television reproducing means, comprising; a cluster of electron guns oriented to emit mutually divergent electron streams, means for deflecting said streams, a short magnetic lens coaxially disposed therewith on the opposite side of said deflection means from said guns, a transducing screen lying beyond said lens, said screen composed of adjacent elemental areas lying in different planes, each oriented to receive impingement of one of said streams and each lying at the point of focus of the electron streams as regards minimum cross-sectional area and as regards convergence by said lens.

18. In an electronic device, in combination; electron deflection means and a dynamic electron lens comprising; means for forming a relatively constant magnetic field having radial components symmetrical with respect to an axis containing the centers of said deflection means and said field, said forming means surrounding the electron paths in said device, and means for altering the radial components of said magnetic field to become symmetrical with respect to other axes disposed at an angle to the first said axis said latter means having the form of coils disposed on opposite sides of said forming means.

19. In an electronic device, in combination with means for forming more than two electron streams diverging from an axis and a multiplanar surface in the path of said streams, an intervening dynamic electron lens comprising; means coaxial with said axis and enclosing all said streams for forming an electrostatic field symmetrical with respect to said axis, and means for altering the field of said means to become symmetrical with respect to other axes disposed at an angle to the first said axis.

20. In an electronic device, in combination with means for forming more than two electron streams diverging from an axis and a multiplanar surface in the path of said streams, an intervening dynamic electron lens comprising; means coaxial with said axis surrounding all said streams for forming an electrostatic field symmetrical with respect to an axis determined by the geometry of said means, and means auxiliary to said electrostatic means for altering said field thereof to shift the axis of symmetry to a new position at an angle to said prior axis.

21. In an electronic device, in combination; electron deflection means and a dynamic electron lens comprising; a short coil having an axis passing through the center of said deflection means, the turns of said coil surrounding the electron paths in said device, a pair of fixed auxiliary coils having axes colinearly disposed and intersecting the axis of the first said coil, means for causing an essentially constant electric current to flow through the first said coil and for causing an essentially varying electric current to flow through said auxiliary coils.

22. In an electronic device, in combination with means for forming more than two electron streams diverging from an axis and a multiplanar surface in the path of said streams, an intervening dynamic electron lens comprising; plural spaced colinear cylinders encompassing all said electron streams and coaxially disposed with respect to said axis, means for impressing plural potentials upon the cylinders, and means for altering the potential around the periphery of said cylinders for converging all said streams to adjacency upon said multiplanar surface regardless of the position of impact of said streams upon said surface.

23. In an electronic device, in combination with means for forming more than two electron streams diverging from an axis and a multiplanar surface in the path of said streams, a dynamic electron lens comprising; plural spaced colinear cylinders encompassing all said electron streams and coaxially disposed with respect to said axis, means for impressing plural potentials upon the cylinders, means for causing a current flow around the periphery of a cylinder, from one to the opposite side thereof for converging all said streams to adjacency upon said multiplanar surface at a position upon said surface corresponding to the amplitude and direction of said current flow.

24. In combination with means for forming more than two electron streams diverging from an axis and a multiplanar surface in the path of said streams, a dynamic electron lens system, comprising; plural electrostatic hollow cylinders surrounding all said electron streams and coaxially disposed with respect to said axis composed of axial segmental surfaces, means for impressing a potential upon each of said segmental surfaces of each said cylinder, the value of the potential corresponding to a single valued function of the peripheral position of said surface, and means for altering the potentials of said surfaces as a function of time.

25. An electronic device, comprising; a source of more than two electron streams, means to mutually diverge said streams, common means to deflect all said streams as a group, plural cylindrical coaxially related conductors enclosing all said streams as a group, means for impressing plural potentials upon said plurality of conductors, means for varying said potentials around the periphery of said conductors, only one transducing surface having contiguous dissimilar elements, said surface positioned beyond said conductors in the region in which said electron streams are converged to adjacency by coaction with said cylindrical conductors.

26. Television reproducing means, comprising; means for producing a plurality greater than two of divergent electron streams, unitary means for deflecting all said plural streams in plural dimensions as a group within the single volume surrounded by said unitary means, plural energy means for exciting said unitary means, plural hollow cylindrical elements each enclosing all said deflected plural streams, means for holding the first cylinder at a high average potential, means associated with one of said plural energy means for modifying said high potential around the periphery of said cylinder, means for holding a second cylinder at a low average potential, means for holding a third cylinder at a high average potential, means associated with another of said plural energy means for modifying said high potential around the periphery of said cylinder said latter modifying means effecting a potential modification peripherally different from said former modifying means, and multi-planar transducing means located beyond said cylindrical elements in the path of said plural electron streams for receiving all said streams in a converged group upon adjacent elemental areas thereof for forming only one color television image thereon.

27. Television reproducing means, comprising; means for producing a plurality of divergent electron streams, unitary means for deflecting said plural streams in plural dimensions, plural energy means for exciting said unitary means, a coil of wire enclosing said deflected electron streams, means for causing a relatively constant current to flow in said coil, a pair of coils adjacent the periphery of the first said coil on opposite sides thereof, the axes of said pair being colinear and substantially intersecting the axis of the first said coil, the turns of said pair of coils being wound in the same direction, means for causing a relatively varying current flow in said pair of coils in synchronism with the excitation of one of the energy means exciting said unitary means, a second pair of coils similarly constituted and positioned, save at other opposite sides of said periphery, and similarly excited, save from another of said energy means, and transducing means located beyond said coil of wire in the path of said plural electron streams.

28. In an electronic device, in combination; electron deflection means and a dynamic electron lens comprising; means for forming a relatively constant magnetic field having radial components symmetrical with respect to an axis determined by the geometry of said means and of said deflection means, said forming means surrounding the electron paths in said device and auxiliary magnetic means in the form of coils disposed on opposite sides of said forming means for altering said magnetic field to shift the axis of symmetry of said radial components to a new position at an angle to said prior axis.

29. In an electronic device, in combination; electron deflection means and a dynamic electron lens comprising; a short coil having an axis passing through the center of said deflection means, the turns of said coil surrounding the electron paths in said device, and a pair of fixed auxiliary coils having axes colinearly disposed and intersecting the axis of the first said coil, the windings of said auxiliary coils being in the same direction.

30. An electron discharge device comprising electrode means for producing a plurality of electron beams along respective paths having a common general direction, a target electrode mounted transversely to said beam paths, deflection means positioned between said electrode means and said target electrode, and electron lens producing means surrounding said beam paths between said deflection means and said target for establishing a common converging and focusing field for said electron beams.

31. An electron discharge device comprising electrode means for producing a plurality of electron beams along respective paths having a common general direction, a target electrode mounted transversely to said beam paths, deflecting means between said electrode means and said target electrode, and electron lens producing means surrounding said beam paths between said deflecting means and said target electrode for establishing a common converging field for said beams for converging said beams to a common point of convergence near said target electrode.

32. An electron discharge device comprising electrode means for producing a plurality of electron beams along respective paths having a common general direction, a target electrode mounted transversely to said beam paths, deflection means for deflecting said plurality of electron beams, said deflection means disposed adjacent to said electrode means, and electron lens producing means surrounding said beam paths between said deflection means and said target electrode for establishing a common magnetic converging field for said beams for converging said beams to a common point of convergence near said target electrode.

33. An electron discharge device comprising electrode means for producing a plurality of electron beams along respective paths having a common general direction, a target electrode mounted transversely to said beam paths, beam-deflecting means between said electrode means and said target electrode, and electron lens producing means surrounding said beam paths between said beam-deflecting means and said target electrode for establishing a common electrostatic converging field for said beams for converging said beams to a common point of convergence near said target electrode.

34. An electron discharge device comprising electrode means for producing a plurality of electron beams along respective parallel paths having a common general direction, a target electrode mounted transversely to said beam paths, beam deflecting means between said electrode means and said target electrode, and electron lens producing means surrounding said beam paths between said beam deflecting means and said target electrode for establishing a common converging field for said beams for converging said beams to a common point of convergence near said target electrode.

35. A cathode ray tube comprising a plurality of electrodes including electron emitting cathode means for producing a plurality of electron beams along respective paths having a common general direction, a target electrode mounted transversely to said beam paths, focusing means located along said paths between said beam producing electrodes and said target electrode for providing a separate focusing action on the electrons of each beam, beam deflecting means between said cathode means and said target electrode, and electron lens producing means surrounding said beam paths between said beam deflecting means and said target electrode for establishing a common converging and focusing field for said electron beams.

36. A cathode ray tube comprising a plurality of electrodes for producing a plurality of electron beams along respective paths having a common general direction, a target electrode mounted transversely to said beam paths, said beam producing electrodes including a plurality of cathode electrodes, focusing means located along said paths between said beam producing electrodes and said target electrode for providing a separate focusing action on the electrons of each beam, beam deflecting means located between said beam producing electrodes and said target electrode, and a magnetic coil symmetrically disposed around said beam paths between said beam deflecting means and said target electrode for establishing a common converging field for bringing said beams to convergence near said target electrode.

37. An electron discharge device comprising electron gun means including electron emitting means and a plurality of electrodes for producing a plurality of electron beams along paths diverging from each other and having a common general direction, a target electrode mounted transversely to said paths, electron beam deflecting means disposed between said electron gun means and said target electrode, and electron lens producing means surrounding said beam paths between said electron beam deflecting means and said target electrode for establishing a common converging field for said beams for converging said beams to a common point of convergence near said target electrode.

38. An electron discharge device comprising electron gun means including electron emitting means and a plurality of electrodes for producing a plurality of electron beams along parallel paths having a common general direction, electrode means adjacent to said beam producing electrode means for causing said parallel beams to diverge from each other, a target electrode mounted transversely to said beam paths, beam deflecting means positioned between said electrode means and said target electrode, and electron lens producing means surrounding said beam paths between said beam deflecting means and said target electrode for establishing a common converging field for said beams for converging said beams to a common point of convergence near said target electrode.

References Cited in the file of this patent

UNITED STATES PATENTS

| | | |
|---|---|---|
| 2,083,203 | Schlesinger | June 8, 1937 |
| 2,165,028 | Blumlein | July 4, 1939 |
| 2,173,267 | Strutt et al. | Sept. 19, 1939 |
| 2,214,729 | Hickok | Sept. 17, 1940 |
| 2,218,702 | Diels et al. | Oct. 22, 1940 |
| 2,272,232 | Wagner | Feb. 10, 1942 |
| 2,289,319 | Strobel | July 7, 1942 |
| 2,293,418 | Wagner | Aug. 18, 1942 |
| 2,348,133 | Iams | May 2, 1944 |
| 2,446,791 | Schroeder | Aug. 10, 1948 |
| 2,457,175 | Parker | Dec. 28, 1948 |
| 2,457,495 | Rochester | Dec. 28, 1948 |
| 2,459,732 | Bradley | Jan. 18, 1949 |
| 2,480,848 | Geer | Sept. 6, 1949 |
| 2,481,839 | Goldsmith | Sept. 13, 1949 |
| 2,518,200 | Sziklai et al. | Aug. 8, 1950 |
| 2,529,485 | Chew | Nov. 14, 1950 |
| 2,532,511 | Okolicsanyi | Dec. 5, 1950 |
| 2,539,492 | Smyth | Jan. 30, 1951 |
| 2,595,548 | Schroeder | May 6, 1952 |
| 2,660,612 | Wood | Nov. 24, 1953 |

FOREIGN PATENTS

| | | |
|---|---|---|
| 380,381 | Great Britain | Sept. 15, 1932 |
| 169,756 | Switzerland | Sept. 1, 1934 |
| 866,065 | France | Mar. 31, 1941 |
| 562,168 | Great Britain | June 21, 1944 |